(12) United States Patent
Al Qanaei (10) Patent No.: US 8,858,732 B1
(45) Date of Patent: Oct. 14, 2014

(54) CHEMICAL PIGGING APPARATUS INCLUDING AN INFLATABLE DEVICE AND METHOD OF USING SAME

(71) Applicant: Ahmad A. M. J. J. Al Qanaei, Salwa (KW)

(72) Inventor: Ahmad A. M. J. J. Al Qanaei, Salwa (KW)

( * ) Notice: Subject to any disclaimer, the term of this patent is extended or adjusted under 35 U.S.C. 154(b) by 0 days.

(21) Appl. No.: 14/225,748

(22) Filed: Mar. 26, 2014

(51) Int. Cl.
- *B08B 9/04* (2006.01)
- *B08B 9/02* (2006.01)
- *B08B 9/00* (2006.01)
- *B08B 9/055* (2006.01)

(52) U.S. Cl.
CPC .................................. *B08B 9/0551* (2013.01)
USPC ............. 134/166 C; 15/104.061; 15/104.062; 15/104.05

(58) Field of Classification Search
CPC .... B08B 9/055; B08B 9/0553; B08B 9/0557; B08B 9/0558; F16L 55/26; F16L 2101/12; F16L 2101/20
USPC ................ 134/8, 167 C, 22.12, 166 R, 22.18; 15/104.05; 138/93, 89; 137/15.07
See application file for complete search history.

(56) References Cited

U.S. PATENT DOCUMENTS

| | | | |
|---|---|---|---|
| 3,690,348 A | 9/1972 | Patterson | |
| 3,837,214 A | 9/1974 | Guest | |
| 3,908,682 A * | 9/1975 | Thompson | 137/15.07 |
| 5,795,402 A | 8/1998 | Hargett, Sr. et al. | |
| 6,263,534 B1 * | 7/2001 | McCann et al. | 15/3.5 |
| 6,500,271 B1 * | 12/2002 | Moore et al. | 134/8 |
| 6,527,869 B1 | 3/2003 | Bourg | |
| 6,615,848 B2 | 9/2003 | Coats | |
| 6,874,193 B2 | 4/2005 | Pruett | |
| 7,354,483 B2 | 4/2008 | Farris | |
| 7,815,744 B2 * | 10/2010 | Abney et al. | 134/22.18 |
| 7,827,646 B2 | 11/2010 | Pruett | |
| 2011/0061681 A1 * | 3/2011 | Cassidy | 134/8 |

OTHER PUBLICATIONS

Combined Method for Oil & Gas Pipeline Cleaning—www.challenger-sos.com/download/Combined-CleaningMethod.pdf, retrieved on Dec. 16, 2013, 12 pages.
Andre van der Werff, The Importance of Pipeline Cleaning; Risks, Gains, Benefits, Peace of Mind—www.pipeline-conference.com/sites/default/files/papers/224%20van%20der%20Werff.pdf, retrieved Dec. 16, 2013, Pipeline Technology 2006 Conference, 2006, 5 pages.

* cited by examiner

*Primary Examiner* — Michael Barr
*Assistant Examiner* — Irina Graf
(74) *Attorney, Agent, or Firm* — Richard C Litman (57) ABSTRACT

The remote controlled chemical pigging apparatus includes a housing and an inflatable device. The inflatable device contains chemicals to dissolve hardened or fossilized materials or contaminants contained within the interior portion of a pipeline, such as an oil or gas pipeline. At a specific location in the pipeline, such as at a pig apparatus receiver portion of the pipeline, the inflatable device is inflated and exploded to disperse the pipeline chemicals contained therein onto the hardened materials or contaminants that have fossilized within the pipeline. The hardened, fossilized materials or contaminants are then dissolved to liquefy the contaminants and, subsequently, to discharge the liquefied contaminants through a drain located in the pipeline. A method of cleaning a pipeline with a remote controlled chemical pigging apparatus having an inflatable device is also provided.

17 Claims, 6 Drawing Sheets

CHEMICAL PIGGING APPARATUS INCLUDING AN INFLATABLE DEVICE AND METHOD OF USING SAME

BACKGROUND OF THE INVENTION

1. Field of the Invention

The present invention relates generally to tools and devices for cleaning and maintaining equipment and particularly to a chemical pigging apparatus for pipelines.

2. Description of the Related Art

Practically all fluids, e.g. gas and oil, include various contaminants and materials that eventually fall out of solution or react with other materials. This is a particular problem in oil and gas pipelines and related conduits, as the contaminants and solids can include, for example, heavy organic materials such as asphaltenes, asphaltogenic acids, diamondoids, paraffins/wax, and resins, which exist in crude oils and tend to build up along the inner walls of the pipes. If this condition is left to continue for a sufficiently long time, the buildup of contaminants can reach such a thickness that the inner diameter of the pipe becomes significantly restricted, thus reducing fluid flow and efficiency of the pipe. The deposition of these suspended particles, therefore, severely inhibits the production and transportation of petroleum fluids. Moreover, such buildups almost always also results in uneven buildups within the pipes, thus creating turbulence and hydrodynamic or aerodynamic drag or resistance to the flow of materials through the pipes.

Accordingly, various systems have been developed in the past for cleaning such residue and deposits from the interior wall surfaces of pipes. Many, if not most, of these systems include remotely controlled or automated "pigs," i.e., devices that conform to the interior of the pipe and travel the pipe to accomplish their intended purpose automatically. These pipeline pigs that are adapted or configured for cleaning out the pipes generally use some form of physical action to remove the buildup within the pipes, such as mechanical scrapers or high pressure blasting with liquids and/or particulates.

However, such scrapers and automatic pigs typically do not have the ability to break up and dissolve the deposits and residues that remain in the pipes, particularly in the receiving end of the pipeline, after the interior wall surfaces of the pipes are cleaned. This can make the process of extracting the scraper and cleaning the pig relatively hazardous and dangerous.

Thus, a chemical pigging apparatus addressing the aforementioned problem is desired.

SUMMARY OF THE INVENTION

Embodiments of a chemical pigging apparatus and methods are provided to clean a pipeline and substantially eliminate materials and contaminants that have hardened within the interior of the pipeline, particularly in the chemical pigging apparatus receiver portion of the pipeline. Embodiments of a chemical pigging apparatus include an inflatable device having pipeline cleaning chemical(s) therein. The inflatable device is adapted to explode to disperse the pipeline cleaning chemical(s) onto the hardened materials or contaminants in the interior of the chemical pigging apparatus receiver portion of the pipeline. Once the materials and contaminants have been liquefied by the action of the dispersed pipeline cleaning chemical(s), the liquefied materials and contaminants are drained from the pipeline through a drainage line.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
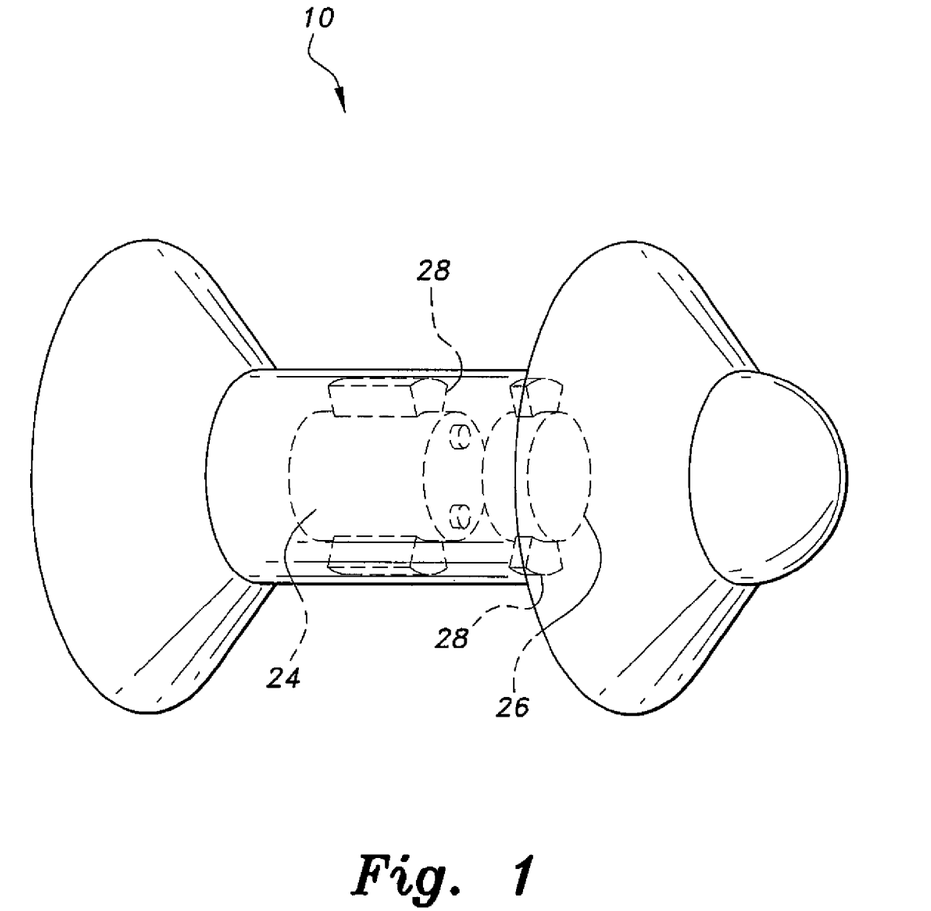
FIG. 1 is an environmental perspective view of an embodiment of a chemical pigging apparatus for pipelines according to the present invention.
Figure 2:
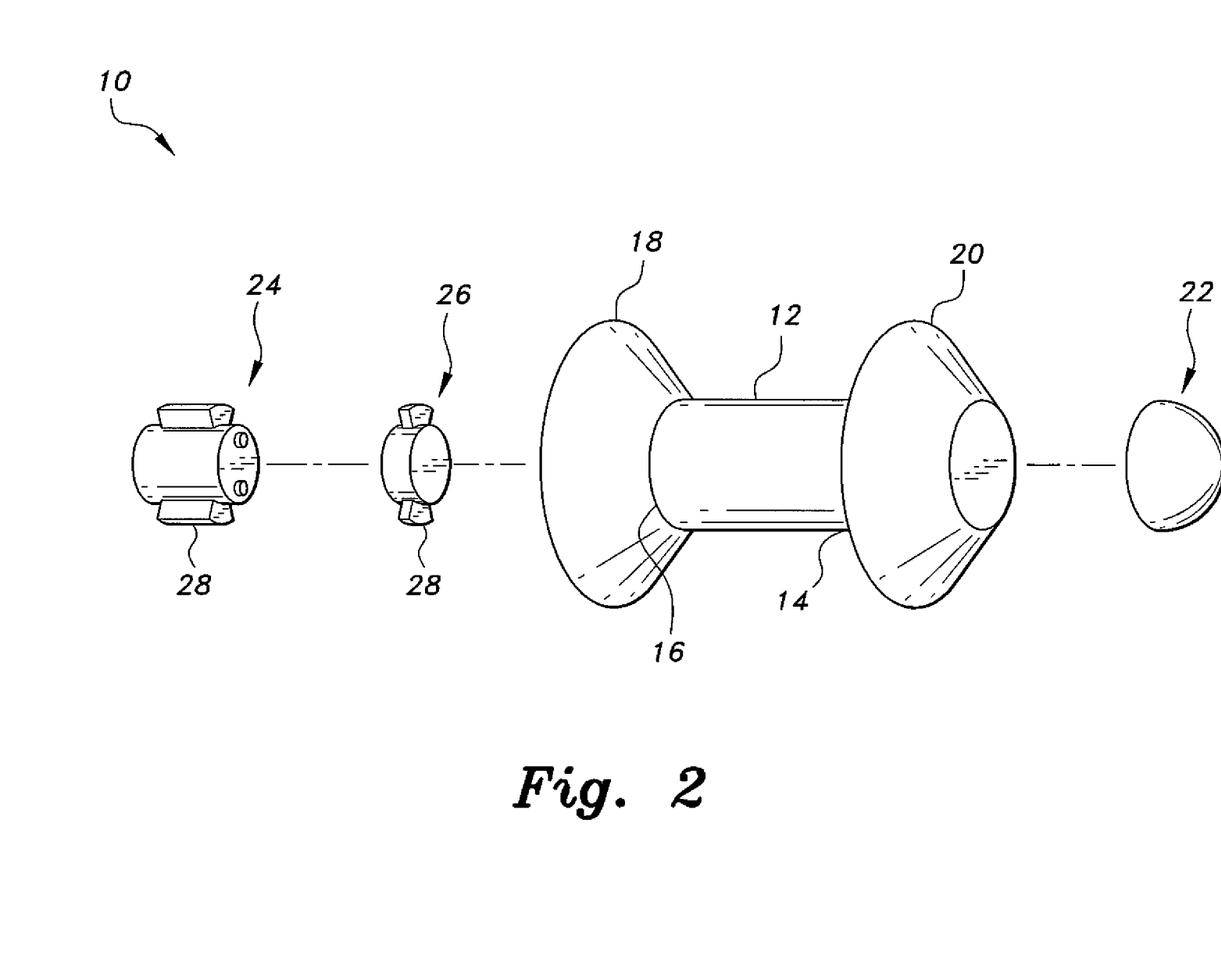
FIG. 2 is an exploded perspective view of an embodiment of a chemical pigging apparatus of FIG. 1, illustrating its various components according to the present invention.

Referring to FIGS. 1-7, as seen in FIGS. 1 and 2, an embodiment of a chemical pigging apparatus 10 is illustrated. The chemical pigging apparatus 10 includes a housing 12 and an inflatable device 22, such as an air bag, which is passively propelled through a pipeline by differential pressure in a chemical pipeline P illustrated in FIGS. 3, 6 and 7. Once the chemical pigging apparatus 10 reaches a given location of the pipeline P, such as a chemical pigging apparatus receiver portion R of the chemical pipeline P, as associated with hardened materials or contaminants C to be removed, such as accumulated hydrocarbons, the inflatable device 22 is inflated to explode the inflatable device, such as by an explosion caused by an electric charge delivered by a power source 24 acting on one or more explosive agents. Prior to explosion, the inflatable device 22 can be in inflated, partially inflated or deflated, and includes the pipeline cleaning chemical(s).

For example, the inflatable device 22, in addition to the chemicals to dissolve the contaminants C, can include the one or more explosive agents as can be various gas generating explosive agents, such as one or more of sodium azide, sodium nitrate and potassium nitrate, for example. When an electric charge from the power source 24 is applied, and the explosive agents are ignited, such as to generate a gas, as nitrogen gas, for example, to cause the inflatable device to inflate and explode to disperse the pipeline cleaning chemical(s) onto the hardened materials or contaminants C contained within a portion of the interior of the pipeline P, such as the chemical pigging apparatus receiver portion R of the pipeline P.

The power source 24 can include a direct current (DC) power supply derived from a battery, such as a 12 volt DC battery, for example. The electric charge delivered to the one or more explosive agents from the power source 24 to cause the explosion of the one or more explosive agents is delivered through wires 27 that are in communication with inflatable device 22. The explosion of the inflatable device 22 causes the pipeline cleaning chemical(s) therein to be dispersed onto the hardened materials or contaminants C contained within a portion of the interior of the pipeline P, such as the chemical pigging apparatus receiver portion R of the pipeline P.

The pipeline cleaning chemical(s) contained within the inflatable device 22 can be any of various suitable conventional chemical(s), such as organic solvents, or suitable chemical solutions including surfactants that are selected for their ability to dissolve the particular hardened materials or contaminants C within the chemical pigging apparatus receiver portion R of the chemical pipeline P, depending on the use or application, such chemicals or chemical solutions including surfactants are known to one skilled in the art.

Figure 3:
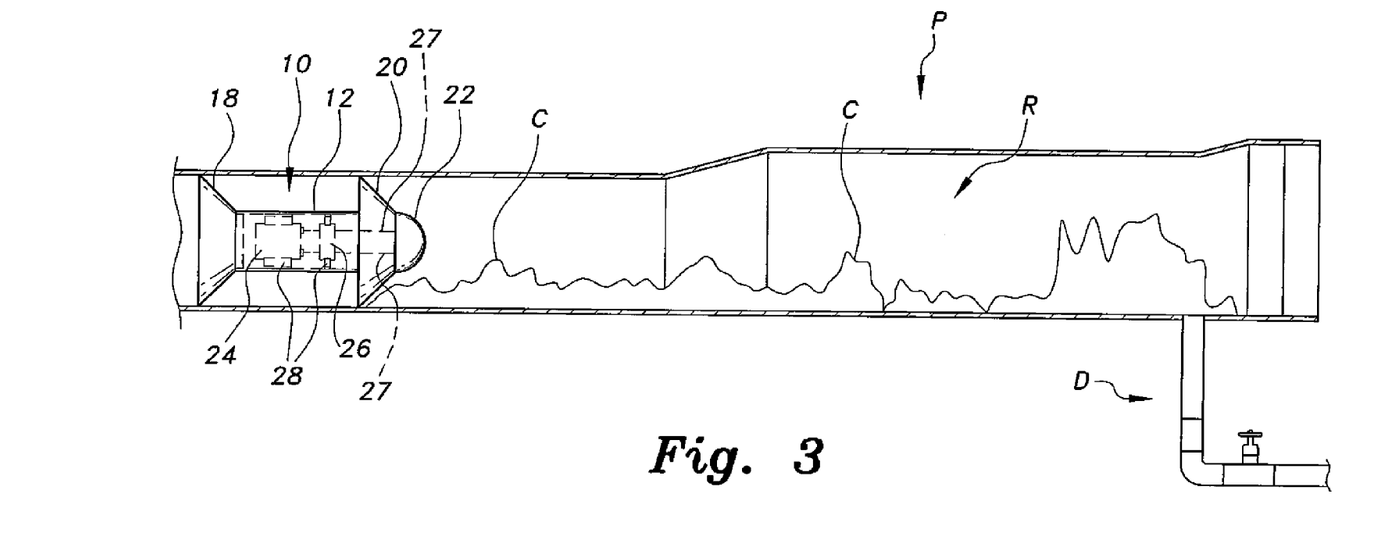
FIG. 3 is an environmental side elevation view in section showing an embodiment of the chemical pigging apparatus of FIG. 1 installed within a straight section of pipeline according to the present invention.
Figure 6:
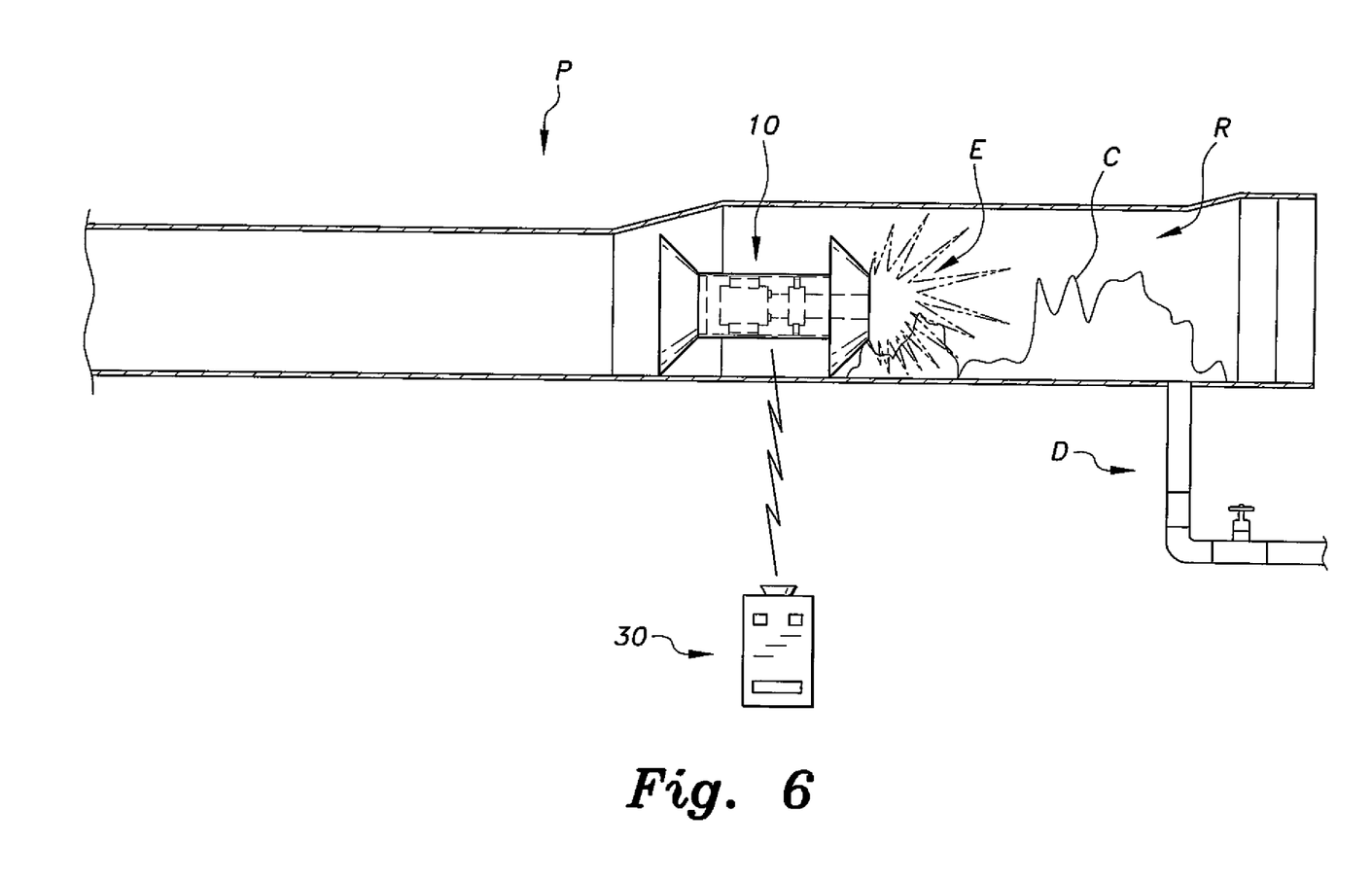
FIG. 6 is an environmental side elevation view showing an embodiment of the chemical pigging apparatus of FIG. 1 installed within a straight section of pipeline, illustrating the explosion of the inflatable device and the dispersal of the pipeline cleaning chemicals, according to the present invention.
Figure 7:
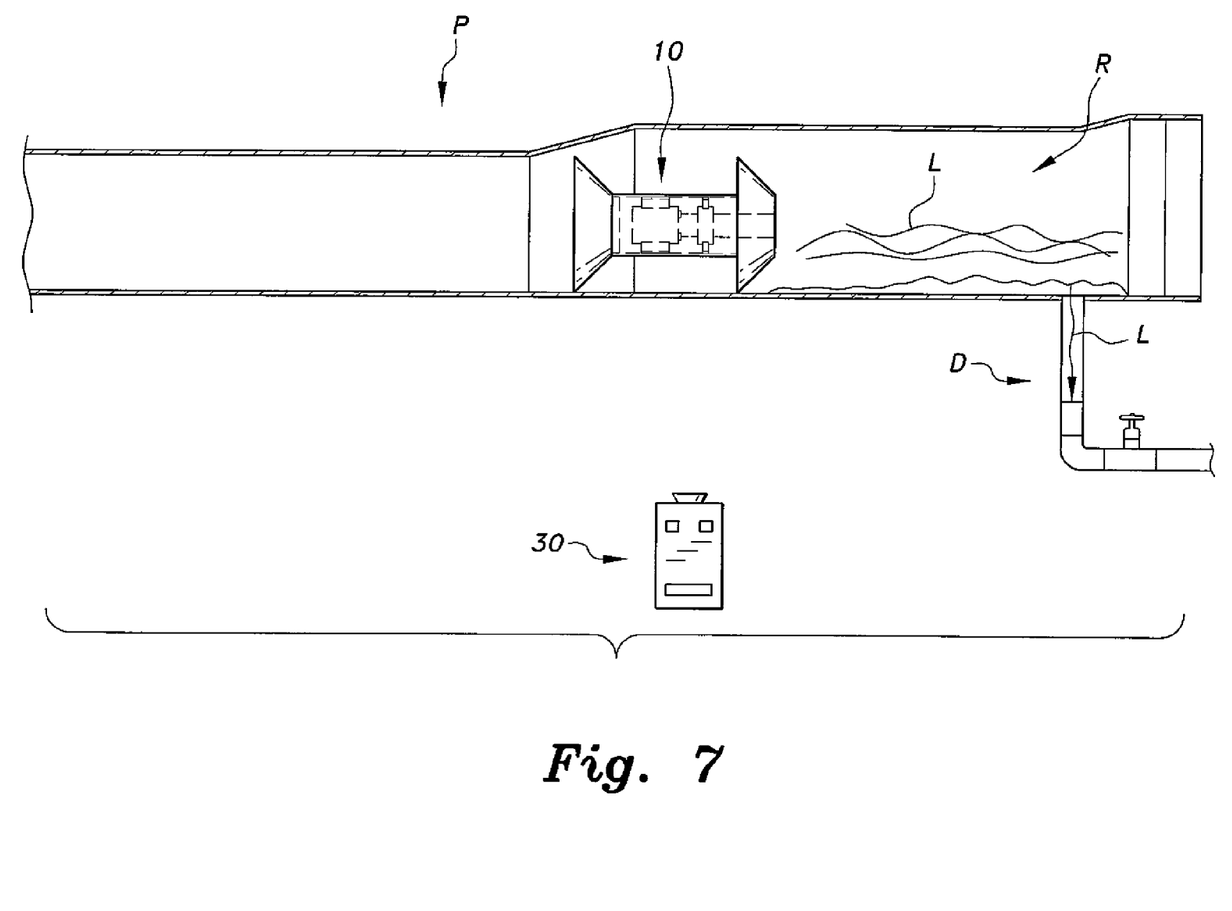
FIG. 7 is an environmental side elevation view showing an embodiment of the chemical pigging apparatus of FIG. 1 installed within a straight section of pipeline, illustrating the drainage of the liquefied contaminants located in the interior portion of the chemical pigging apparatus receiver portion of the chemical pipeline according to the present invention.

FIG. 2 provides an exploded perspective view of the chemical pigging apparatus 10 illustrating various components of the chemical pigging apparatus 10, with FIGS. 3, 6 and 7 illustrating the chemical pigging apparatus 10 at different points in the chemical pipeline P. The chemical pigging apparatus 10 includes the housing 12 having a forward end 14 and a rearward end 16. The forward end 14 is coupled to the inflatable device 22, which can be selectively removed to include the pipeline cleaning chemical(s), as well as one or more explosive agents to inflate and explode the inflatable device 22, the one or more explosive agents can also be incorporated with the materials forming the inflatable device 22. The housing 12 is adapted to hold a control unit 26 to control the delivery of power from the power source 24 to inflate and explode the inflatable device 22 to disperse the pipe cleaning chemical(s) into the pipeline P. The housing 12 is associated with a support 28 to hold and position the control unit 26 and the power source 24 within the housing 12 (as shown in FIGS. 1 and 3).

A forward seal 20 is installed about the forward end 14 of the housing 12, and a rearward seal 18 installed about the rearward end 16 of the housing 12, the two seals 20 and 18 respectively sealing the forward end 14 and the rearward end 16 of the housing 12. The inflatable device 22 can be positioned in association with the forward seal 20, for example. These two seals 18 and 20 are of a suitable configuration, such as a generally conical configuration, and can have peripheral sealing edges or lips adapted to fit closely against portions of the interior of the chemical pipeline P, as shown in FIG. 3, for example. The two seals 18 and 20 can be formed of any suitable flexible material such as rubber, silicone, etc. having chemically resistant properties to substantially reduce the likelihood of damage from the hardened materials or contaminants C contained in the chemical pipeline P and also from the pipeline cleaning chemical(s) dispersed from the inflatable device 22.

Continuing with reference to FIGS. 3, 6 and 7, a general operation of an embodiment of the chemical pigging apparatus 10 and embodiments of methods for cleaning at least a portion of the chemical pipeline P, such as the chemical pigging apparatus receiver portion R of the chemical pipeline P. In FIG. 3, the chemical pigging apparatus 10 is illustrated as traversing through the chemical pipeline P toward the chemical pigging apparatus receiver portion R of the chemical pipeline P. Travel or movement of the chemical pigging apparatus 10 through the chemical pipeline P is typically passive, i.e., the chemical pigging apparatus 10 typically does not include a propulsion means or a propulsion device or system to independently move the chemical pigging apparatus 10 in the chemical pipeline P, per se, but can also include such propulsion device or system, and should not be construed in a limiting sense.

Movement or travel of the chemical pigging apparatus 10 through the chemical pipeline P is typically accomplished by a differential pressure in the chemical pipeline P, with a relatively higher pressure supplied behind the rearward seal 18 of the rearward end 16 to move the chemical pigging apparatus 10 through the chemical pipeline P. For example, the forward seal 20 and the rearward seal 18 substantially prevent leakage of this pressure past the chemical pigging apparatus 10, resulting in the chemical pigging apparatus 10 being pushed or moved by the differential pressure through the chemical pipeline P.

Figure 4:
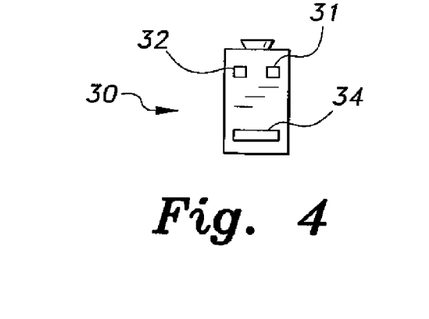
FIG. 4 is an environmental top elevation view of an embodiment of a remote control device of an embodiment of a chemical pigging apparatus of FIG. 1 according to the present invention.

As the pressure differential drives the chemical pigging apparatus 10 through the chemical pipeline P, the chemical pigging apparatus 10 is monitored by a remote control device 30 (shown in FIGS. 4 and 6). The remote control device 30 communicates with the control unit 26, such as by wireless communication, and includes at least one display 32 to visually show information such as location, voltage, temperature, etc. that can provide information as to the cleaning of a portion of the chemical pipeline P, such as the chemical pigging apparatus receiver portion R of the chemical pipeline P. The remote control device 30 typically includes a transmitter/receiver, such as associated with an interface, to communicate with the control unit 26 to send control signals to the control unit 26 or to send or receive information therefrom, such as location, voltage, temperature information related to the chemical pigging apparatus 10 in relation to the chemical pipeline P. The remote control device 30 also can include a location check button 31, that when activated provides an indication, such as on the at least one display 32, if the chemical pigging apparatus 10 is located at or not located at a given location in the pipeline P. The remote control device 30 can also include an activation button 34 to send a control signal to the control unit 26 which, based on the received control signal, causes the power source 24 to deliver the electric charge to inflate and explode the inflatable device 22 to disperse the pipeline cleaning chemical(s) contained therein into the pipeline P.

Figure 5:
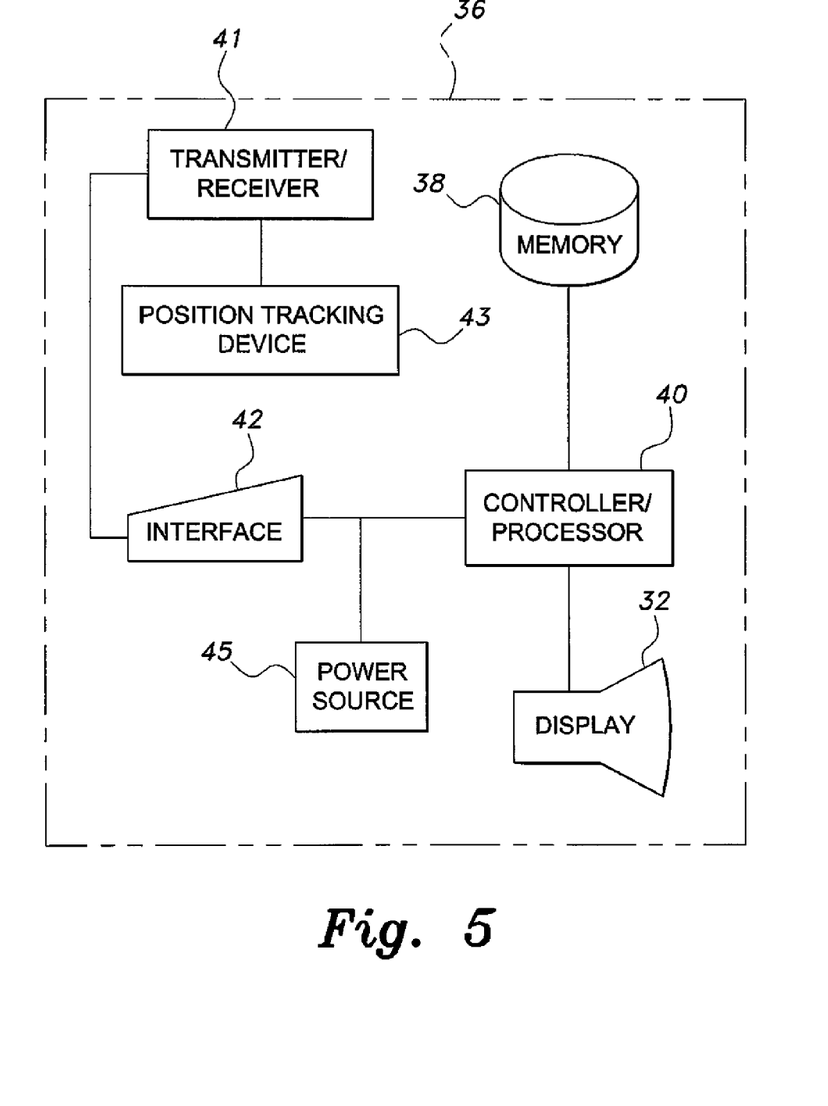
FIG. 5 is a diagram of a generalized system of a remote control device for use with embodiments of a chemical pigging apparatus, such as an embodiment of the chemical pigging apparatus of FIG. 1, according to the present invention.

FIG. 5 illustrates a generalized system 36 for implementing embodiments of an apparatus and methods for controlling the chemical pigging apparatus 10, such as a remote control device, as the remote control device 30. The generalized system can also include components for implementing a control unit of the chemical pigging apparatus, such as the control unit 26. It should be understood that the generalized system 36 can represent, for example, a standalone computer, computer terminal, portable computing device, networked computer or computer terminal, or networked portable device, and can also include a microcontroller, an application specific integrated circuit (ASIC), or a programmable logic controller (PLC), for example.

Data can be entered into the system 36 by the user, or sent or received from or by the remote control device 30 or the control unit 26 via any suitable type of interface 42 as can be associated with a transmitter/receiver 41, such as for wireless transmission/reception or for wireless communication. The transmitter/receiver 41 can be associated with a position tracking device 43, such as can send and receive signals as to a location of the chemical pigging apparatus 10 in the pipeline P. For example, the position tracking device 43 can be associated with a global positioning system (GPS) device, so as to provide information as to a position or location of the chemical pigging apparatus 10. Also the transmitter/receiver 41 can send or receive data or control signals such as sent or received by or from the remote control device 30 or the control unit 26. The control unit 26 and the remote control device 30, as can be implemented by components of the system 36, can also include a memory 38 such as to store data and information, as well as program(s) or instructions for implementing operation of the chemical pigging apparatus 10. The memory 38 can be any suitable type of computer readable and programmable memory, such as non-transitory computer readable media, random access memory (RAM) or read only memory (ROM), for example. The system 36 can also be powered by a system power source 45, such as a battery, for example, as can power operation of the remote control device 30 or the control unit 26. However, the power source to power operation of the control unit 26 can also be the power source 24.

Calculations, determinations, data transmission or data reception, sending or receiving of control signals or commands, such as in relation to inflating and exploding the inflatable device 22, or providing information such as location, voltage, temperature, etc. that can provide information as to the cleaning of a portion of the chemical pipeline P, are performed or executed by a controller/processor 40 of the remote control device 30 or of the control unit 26. The controller/processor 40 can be any suitable type of computer processor, such as a microprocessor or an ASIC, and the calculations, determinations, data transmission or data reception, sending or receiving of control signals or commands processed or controlled by the controller/processor 40 can be displayed to the user of the remote control device 30 on the display 32, which can be any suitable type of computer display, such as a light emitting diode (LED) or liquid crystal display (LCD), for example.

The controller/processor 40 can be associated with, or incorporated into, any suitable type of computing device, for example, a personal computer or a PLC. The display 32, the controller/processor 40, the transmitter/receiver 41, the position tracking device 43, the memory 38, and any associated computer readable media are in communication with one another by any suitable type of data bus, as is well known in the art.

FIG. 6 of the drawings illustrates the chemical pigging apparatus 10 traveling through the chemical pipeline P toward the chemical pigging apparatus receiver portion R of the chemical pipeline P. At one or more locations within the chemical pipeline P, or upon command from a user of the remote control device 30, the remote control device 30 communicates with the control unit 26 located within the housing 12 of the chemical pigging apparatus 10 in order to send or receive information, control signals or commands.

At a given location, such as when the chemical pigging apparatus 10 is located at or within the chemical pigging apparatus receiver portion R of the chemical pipeline P, the remote control device 30, such as by an automatic, preprogrammed command or upon a user activating the activation button 34, sends a control signal to the control unit 26. The control unit 26, upon receiving the control signal from the remote control device 30 controls the power source 24 to deliver an electric charge through the wires 27 associated with the inflatable device 22, to inflate and explode the inflatable device 22 and disperse the pipeline cleaning chemical(s), such as by an explosion E, onto the hardened materials or contaminants C within the interior of the pipeline P, such as within chemical pigging apparatus receiver portion R of the pipeline P.

Continuing with reference to FIG. 7, as illustrated therein, once the pipeline cleaning chemical(s) contained within the inflatable device 22 are dispersed and react with the hardened materials or contaminants C within the interior of the pipeline P, such as within the pigging apparatus receiver portion R of the chemical pipeline P, the reaction of the dispersed pipeline cleaning chemical(s) and the hardened materials or contaminants C in the pipeline P converts the hardened materials or contaminants C into a liquefied hardened materials or contaminants L, the liquefied hardened materials or contaminants L are then drained from the chemical pipeline P through a drainage line D.

It is noted that the chemical pigging apparatus 10 can encompass various designs and uses. For example, the chemical pigging apparatus 10 can be adapted to be used in connection with pipes used in the transfer of lubricating oils, paints, chemicals, toiletries, cosmetics and foodstuffs, and should not be construed in a limiting sense.

It is to be understood that the present invention is not limited to the embodiments described above, but encompasses any and all embodiments within the scope of the following claims.

I claim:

1. A chemical pigging apparatus to clean a pipeline, comprising: a housing; an inflatable device disposed on the housing, the inflatable device containing at least one pipeline cleaning chemical and one or more explosive agents; a control unit coupled to the inflatable device, the control unit to control inflating of the inflatable device to enable exploding of the inflatable device to disperse the at least one pipeline cleaning chemical into the pipeline; and a power source coupled to the control unit to provide power to explode the inflatable device, wherein the power source provides an electrical charge, to explode the one or more explosive agents to inflate and explode the inflatable device.

2. The chemical pigging apparatus according to claim 1, wherein the housing comprises a forward end having a forward seal and a rearward end having a rearward seal to seal the housing.

3. The chemical pigging apparatus according to claim 1, further comprising:
   at least one support to hold and position the control unit and the power source within the housing.

4. The chemical pigging apparatus according to claim 1, wherein the power source is a direct current power supply.

5. The chemical pigging apparatus according to claim 1, wherein the control unit comprises a position tracking device to provide an indication of a location of the chemical pigging apparatus in the pipeline.

6. The chemical pigging apparatus according to claim 1, wherein the one or more explosive agents comprise at least one of sodium azide, sodium nitrate and potassium nitrate.

7. The chemical pigging apparatus according to claim 1, further comprising:
   a remote control device, the remote control device is adapted to communicate with the control unit to selectively control inflating and exploding the inflatable device.

8. The chemical pigging apparatus according to claim 7, wherein the remote control device comprises an activation button to send a control signal to the control unit to selectively control the inflating and the exploding of the inflatable device.

9. A chemical pigging apparatus for cleaning a pipeline, comprising: a housing; an inflatable device disposed on the housing, the inflatable device containing at least one pipeline cleaning chemical and one or more explosive agents; a control unit coupled to the inflatable device, the control unit to control igniting the one or more explosive agents to inflate and explode the inflatable device to disperse the at least one pipeline cleaning chemical into the pipeline; a power source coupled to the control unit to provide power to ignite the one or more explosive agents; and a remote control device, the remote control device is adapted to wirelessly communicate with the control unit to selectively control inflating and exploding the inflatable device.

10. The chemical pigging apparatus according to claim 9, wherein the remote control device comprises an activation button to send a control signal to the control unit to selectively control the inflating and the exploding of the inflatable device.

11. The chemical pigging apparatus according to claim 9, wherein the one or more explosive agents comprise at least one of sodium azide, sodium nitrate and potassium nitrate.

12. The chemical pigging apparatus according to claim 9, wherein the power source provides an electrical charge to generate a gas by igniting the one or more explosive agents.

13. The chemical pigging apparatus according to claim 9, further comprising:
   at least one support to hold and position the control unit and the power source within the housing, and
   wherein the housing comprises a forward end having a forward seal and a rearward end having a rearward seal to seal the housing and the inflatable device is positioned in association with the forward seal.

14. A method for cleaning a pipeline, comprising the steps of: traversing the interior of the pipeline with a chemical pigging apparatus to a position corresponding to a portion of the pipeline to be cleaned, wherein the pigging apparatus includes: a housing;
   an inflatable device disposed on the housing, the inflatable device containing at least one pipeline cleaning chemical and one or more explosive agents;
   a control unit coupled to the inflatable device, the control unit to control inflating of the inflatable device to enable exploding of the inflatable device to disperse the at least one pipeline cleaning chemical into the pipeline; and
   a power source coupled to the control unit to provide power to explode the inflatable device, wherein the power source provides an electrical charge, to explode the one or more explosive agents to inflate and explode the inflatable device;
   igniting the one or more explosive agents to generate a gas to explode the inflatable device, and
   exploding the inflatable device associated with the chemical pigging apparatus to disperse into the pipeline the at least one pipeline cleaning chemical contained in the inflatable device into the portion of the pipeline to be cleaned.

15. The method for cleaning a pipeline according to claim 14, further comprising the steps of:
   liquefying hardened contaminants located in the interior of the portion of the pipeline by the at least one pipeline cleaning chemical dispersed; and
   draining the liquefied hardened contaminants from the pipeline through a drain line.

16. The method for cleaning a pipeline according to claim 14, further comprising the step of:
   wirelessly sending a control signal to a control unit of the chemical pigging apparatus to cause the explosion of the inflatable device.

17. The method for cleaning a pipeline according to claim 14, further comprising the steps of:
   locating the chemical pigging apparatus in the pipeline by a position tracking device; and
   wirelessly communicating a location of the chemical pigging apparatus in the pipeline to a remote control device.

* * * * *